United States Patent
Mahlich

[11] Patent Number: 5,769,135
[45] Date of Patent: Jun. 23, 1998

[54] STEAM OUTLET TUBE ASSEMBLY FOR MAKING BEVERAGES

[75] Inventor: Gotthard Mahlich, Kronberg, Germany

[73] Assignee: Eugster/Frismag AG, Romanshorn, Switzerland

[21] Appl. No.: 600,446

[22] Filed: Feb. 13, 1996

[30] Foreign Application Priority Data

Feb. 17, 1995 [DE] Germany .................. 295 02 594.8

[51] Int. Cl.$^6$ ................................... A47J 31/24
[52] U.S. Cl. ................... 141/70; 141/82; 366/101; 99/293; 99/323.1; 261/76
[58] Field of Search ................. 141/69, 70, 82; 99/293, 323.1, 323.3; 366/101, 106, 107; 261/DIG. 16, DIG. 76

[56] References Cited

U.S. PATENT DOCUMENTS

| | | | |
|---|---|---|---|
| 4,735,133 | 4/1988 | Paoletti | 99/323.1 |
| 4,852,473 | 8/1989 | Bolivar | 99/293 |
| 5,265,519 | 11/1993 | Schiettecatte et al. | 99/293 |
| 5,295,431 | 3/1994 | Schiettecatte et al. | 99/293 |
| 5,330,266 | 7/1994 | Stubaus | 366/101 |
| 5,362,147 | 11/1994 | Schels et al. | 366/107 |
| 5,464,574 | 11/1995 | Mahlich | 99/293 |

FOREIGN PATENT DOCUMENTS

| | | |
|---|---|---|
| 0 509 505 | 10/1992 | European Pat. Off. . |
| 0 575 762 | 12/1993 | European Pat. Off. . |
| 39 02 281 | 6/1990 | Germany . |
| 42 13 895 | 11/1992 | Germany . |

*Primary Examiner*—J. Casimer Jacyna
*Attorney, Agent, or Firm*—Spencer & Frank

[57] ABSTRACT

A steam outlet tube assembly for preparing beverages includes a steam tube having a terminal length portion including an outlet end. The outlet end of the first conduit is located at the terminal length portion of the steam tube. There is further provided a second conduit having an outlet end communicating with the steam tube at the terminal length portion thereof; and a mechanism for selectively placing the second conduit into an unblocked position and into a blocked position. In the unblocked position the steam passing through the steam tube draws liquid through the first conduit and draws air through the second conduit to effect a discharge of a steam/liquid/air mixture through the outlet end of the steam tube. In the blocked position the steam passing through the steam tube draws liquid through the first conduit, to effect a discharge of solely a steam/liquid mixture through the outlet end of the steam tube.

11 Claims, 3 Drawing Sheets

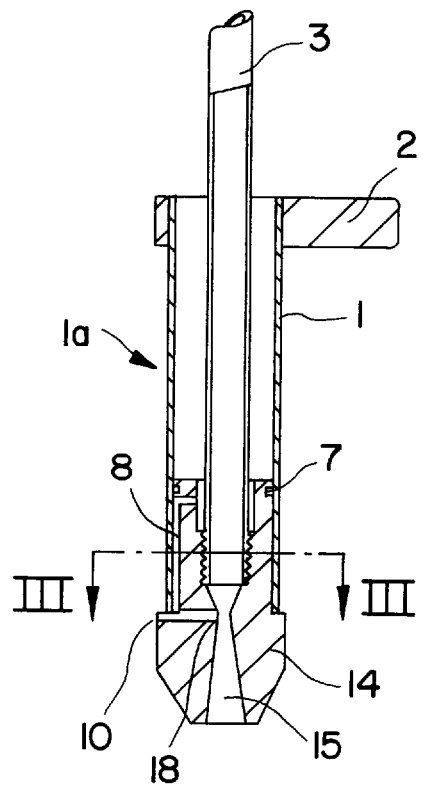
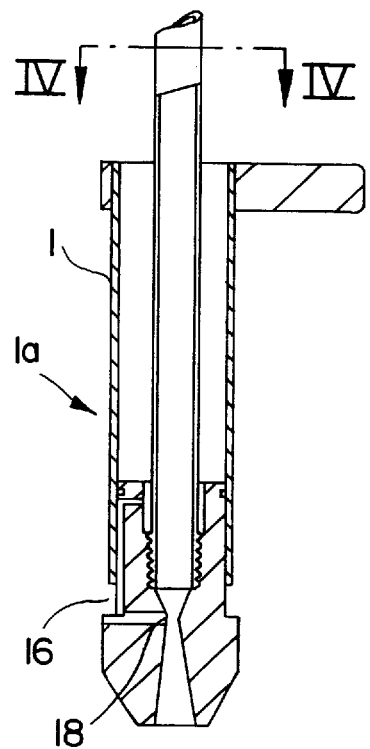
FIG. 1    FIG. 2
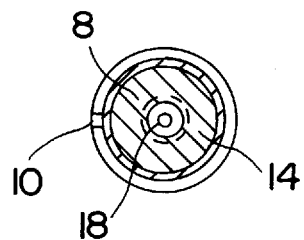
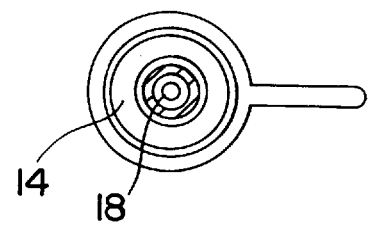
FIG. 3    FIG. 4

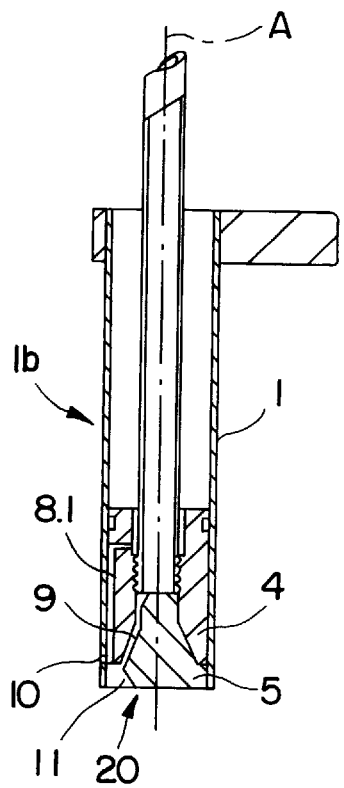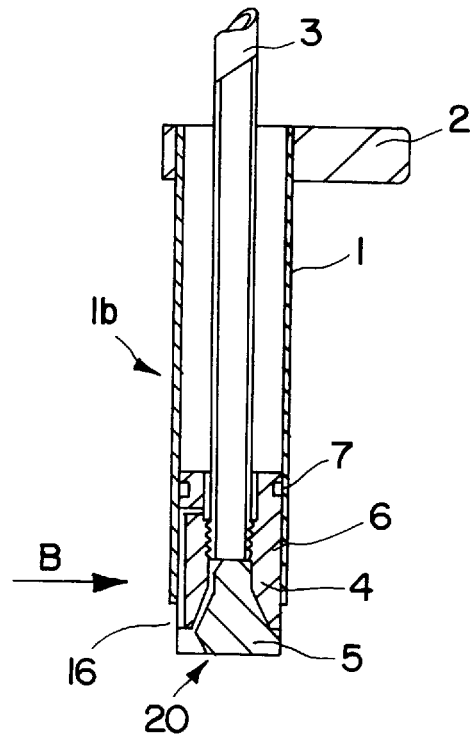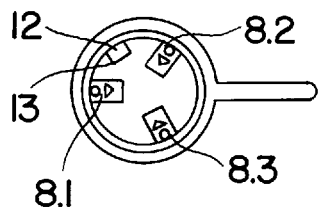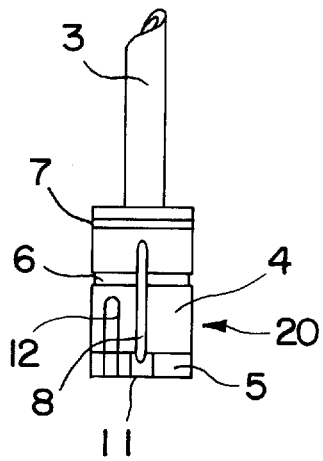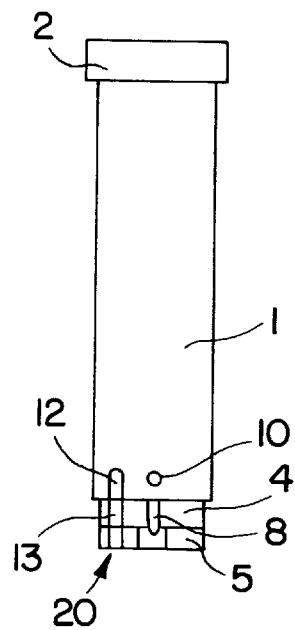

5,769,135

STEAM OUTLET TUBE ASSEMBLY FOR MAKING BEVERAGES

CROSS REFERENCE TO RELATED APPLICATION

This application claims the priority of German Utility Model Application No. 295 02 594.8 filed Feb. 17, 1995, which is incorporated herein by reference.

BACKGROUND OF THE INVENTION

This invention relates to a steam outlet tube assembly for making hot beverages. The assembly is of the type in which a first conduit merges in the outlet region of the steam outlet tube and the other end of the first conduit communicates with a liquid, such as milk, accommodated in a container. Further, the assembly has at least one second, or air conduit whose other end may communicate with air. There is further provided an outer sleeve which surrounds the inner, steam outlet tube. The air conduit extends between the steam outlet tube and the outer sleeve such that from the outlet end of the outlet tube assembly a steam/air/liquid mixture is emitted.

Conventional steam outlet tubes of the above-outlined type are used particularly in household espresso machines for the making of milk foam for cappuccino coffee as described, for example, in published European Application 0 575 762.

Conventional steam outlet tube assemblies with inserted steam nozzles for espresso machines are, apart from generating milk foam, also used for heating liquids and for making hot beverages from instant powders. When for such an application conventional, fixedly installed foam generating arrangements are used, the air admixed to the steam has been found to have an undesired, interfering effect.

SUMMARY OF THE INVENTION

It is an object of the invention to provide an improved steam outlet tube assembly of the above-outlined type in which an operation with air admixture for the preparation of cappuccino coffee or an operation without air admixture, particularly for making beverages from powder is possible.

This object and others to become apparent as the specification progresses, are accomplished by the invention, according to which, briefly stated, the steam outlet tube assembly for preparing beverages includes a steam tube having a terminal length portion including an outlet end. The outlet end of the first conduit is located at the terminal length portion of the steam tube. There is further provided a second conduit having an outlet end communicating with the steam tube at the terminal length portion thereof; and a mechanism for selectively placing the second conduit into an unblocked position and into a blocked position. In the unblocked position the steam passing through the steam tube draws liquid through the first conduit and draws air through the second conduit to effect a discharge of a steam/liquid/air mixture through the outlet end of the steam tube. In the blocked position the steam passing through the steam tube draws liquid through the first conduit, to effect a discharge of solely a steam/liquid mixture through the outlet end of the steam tube.

BRIEF DESCRIPTION OF THE DRAWINGS

FIG. 1 is an axial sectional view of a first preferred embodiment of the invention shown in a first operational position.

FIG. 2 is a view similar to FIG. 1, showing the construction in a second operational position.

FIG. 3 is a sectional view taken along line III—III of FIG. 1.

FIG. 4 is a sectional view taken along line IV—IV of FIG. 2.

FIG. 5 is an axial sectional view of a second preferred embodiment of the invention shown in a first operational position.

FIG. 6 is a view similar to FIG. 5 showing the construction in a second operational position.

FIG. 7 is a bottom plan view of the structure shown in FIG. 5.

FIG. 8 is a side elevational view of a detail of the structure shown in FIGS. 5 and 6.

FIG. 9 is a side elevational view of the construction shown in FIG. 6.

DESCRIPTION OF THE PREFERRED EMBODIMENTS

Figure 10:
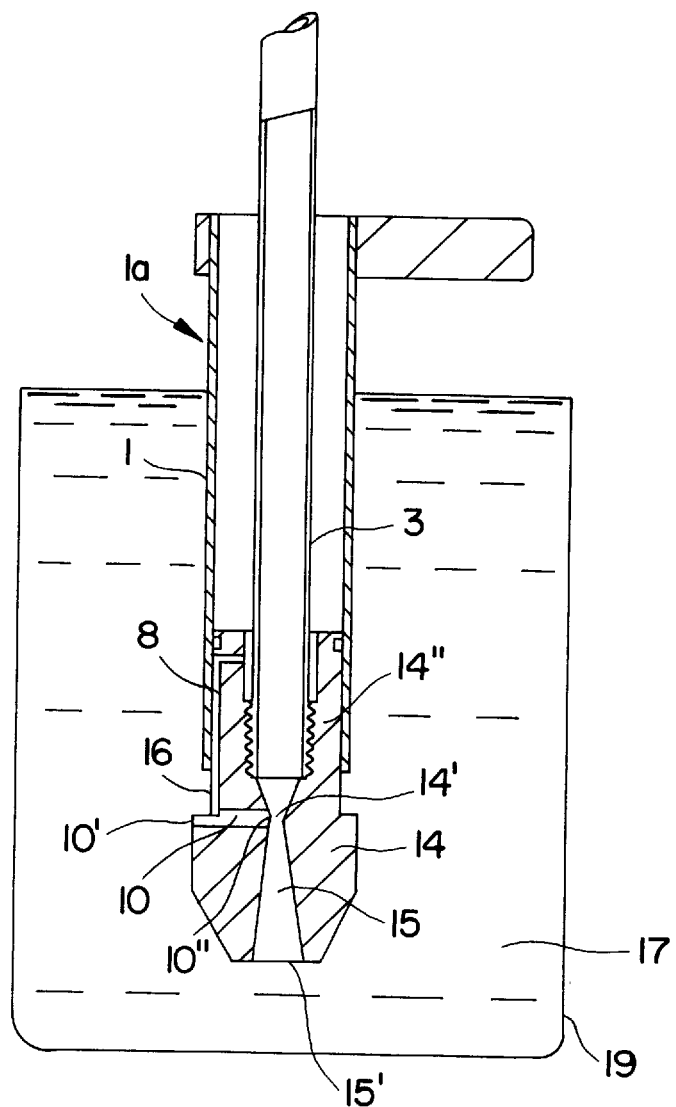
FIG. 10 is an enlarged axial sectional view of the structure shown in FIG. 2, illustrated in a submerged state.

Turning to the embodiment illustrated in FIGS. 1–4 and 10, the steam outlet tube assembly generally designated at 1a comprises a steam tube 3 whose lower terminal portion is formed of a nozzle head 14 in which the steam tube has a Venturi constriction 18 and a Venturi tube 15 terminating in an outlet 15' which constitutes the steam tube outlet. In the nozzle head 14 a channel or conduit 10 is provided which has an inlet end 10' and an outlet end 10". The outlet end 10" merges into the steam tube 3 at the Venturi constriction 18.

In the nozzle head 14 a further channel or conduit 8 is provided which has a common length portion with the conduit 10 and has an outlet which is identical to the outlet 10" of the conduit 10 and thus ends in the Venturi constriction 18. The opposite end of the conduit 8 is situated substantially above the outlet 15' of the steam tube 3 as well as the inlet 10' of the conduit 10 so that during operation, when the inlet 10' and the outlet 15' are submerged in a liquid 17 accommodated in a vessel 19, the inlet of the conduit 8 communicates with air.

An outer sleeve 1 supported on a neck portion 14" of the nozzle head 14 is axially slidable thereon to assume a first or closed position shown in FIG. 1 and a second or open position shown in FIGS. 2 and 10. A manually engageable handle 2 is attached to the sleeve 1 for displacing the latter between the open and closed positions.

In the closed position of the sleeve 1 as shown in FIG. 1, the conduit 8 is laterally closed so that the outlet of the conduit 8, merging in the Venturi constriction 18, is in communication solely with the inlet of the conduit 8. This means that in the closed position of the sleeve 1 steam which is forced through the steam tube 3 draws air through the unblocked conduit 8 into the Venturi tube 15 and also draws liquid through the conduit 10 into the Venturi tube 15. Thus, a steam/liquid/air mixture is discharged from the outlet end 15' of the steam tube 3 for generating milk foam, particularly for cappuccino coffee.

In the open position of the sleeve 1, as illustrated in FIGS. 2 and 10, the conduit 8 is laterally open along a conduit portion 16 at a location spaced from its outlet that merges into the Venturi constriction 18. As a result of the open position of the sleeve 1, in operation (that is, in the submerged state of the nozzle head 14) the liquid blocks the air conduit 8. Therefore, when steam is forced through the steam tube 3, the Venturi arrangement is not able to draw air through the liquid-blocked air conduit 8 and consequently only liquid will be drawn into the Venturi constriction 18 through the conduit 10. Consequently, solely a steam/liquid mixture will be discharged at the outlet end 15' of the steam tube 3 which is particularly adapted to prepare hot beverages from instant powder where the absence of air in the liquid/steam mixture is of advantage.

FIGS. 5–9 illustrate another preferred embodiment of the invention. In the steam outlet tube assembly generally designated at 1b, the Venturi nozzle 14 of the earlier-described embodiment is replaced by a nozzle head generally designated at 20, formed of an upper nozzle head portion 4 and a lower nozzle head portion 5. The lower nozzle head portion 5 has a conical configuration which fits into a conical cavity of the upper nozzle head portion 4. Between the two nozzle head portions a plurality of outlet nozzles 9 are defined which are circumferentially distributed and extend at an acute angle to the longitudinal steam tube axis A. The outlet nozzles 9 communicate with the steam tube 3 and at their outlet end terminate in a respective low-pressure chamber 11.

With each low-pressure chamber 11 a conduit 10 is connected whose inlet end is, during operation, similarly to the earlier-described embodiment, in communication with the surrounding liquid.

Air conduits 8.1, 8.2 and 8.3 which are provided in the upper nozzle head portion 4 and which communicate with one another by an annular circumferential groove 6 provided in the upper nozzle head portion 4, merge into a respective low-pressure chamber 11.

An outer sleeve 10 is axially slidably supported on the upper nozzle head portion 4 and simultaneously controls the three air conduits 8.1, 8.2 and 8.3. Thus, in the closed position of the sleeve 1 as shown in FIG. 5, the air conduits 8.1, 8.2 and 8.3 are unblocked, that is, as steam is forced through the steam tube 3 and out of the outlet nozzles 9, air is drawn into the respective low-pressure chambers 11 through the air conduits 8.1, 8.2 and 8.3 and also, liquid is drawn into the low pressure chambers 11 through the liquid conduits 10. As a result, from the low pressure chambers 11 steam/liquid/air mixture is discharged into the liquid, such as milk, and effective foam generation results.

In the open position of the sleeve 1 as shown in FIGS. 6 and 9, the air conduits 8.1, 8.2 and 8.3 are blocked by the liquid into which the nozzle head 20 is submerged during operation and thus as steam is forced through the steam tube 3, the low-pressure chamber 11 draws only liquid so that from the low pressure chambers 11 only a liquid/steam mixture is discharged. In this position, similarly to the position shown in FIGS. 2 and 10 of the first-described embodiment, hot beverage from instant powder can be advantageously prepared and also, the radial outlet nozzles 9 through which no air flows, are particularly effective for a lump-free preparation and mixing of instant powder beverages.

With particular reference to FIGS. 7, 8 and 9, the upper nozzle head portion 4 is provided with an axially extending sleeve positioning groove 13 into which extends an embossment 12 provided on the inside surface of the sleeve 1 to ensure an axial guidance of the sleeve 1 on the upper nozzle head portion 4. For a hermetic guidance of the sleeve 1 on the upper nozzle head portion 4 the latter is provided with an annular sealing ring 7.

The invention thus provides a valve arrangement for selectively unblocking or blocking the air conduit 8 (FIGS. 1–4 and 10) or the air conduits 8.1, 8.2 and 8.3 (FIGS. 5–9). It is to be understood, however, that as an alternative to the described sleeve-type valving device, other arrangements may be utilized for allowing or preventing air flow in the air conduits, such as, for example, a manually operable on-off valve placed, for example, within the air conduit or conduits in the region of the inlet end communicating with the atmosphere.

It will be understood that the above description of the present invention is susceptible to various modifications, changes and adaptations, and the same are intended to be comprehended within the meaning and range of equivalents of the appended claims.

What is claimed is:

1. A steam outlet tube assembly for preparing beverages, comprising
   (a) a steam tube having a terminal length portion including an outlet end; said steam tube being adapted to guide steam therein and eject the steam through said outlet end of said steam tube; in operation said outlet end of said steam tube being submerged in a liquid;
   (b) a first conduit having an inlet end and an outlet end; said outlet end of said first conduit being located at said length portion of said steam tube; in operation said inlet end of said first conduit being submerged in the liquid;
   (c) a second conduit having an inlet end and an outlet end; said outlet end of said second conduit being located at said terminal length portion of said steam tube; in operation said inlet end of said second conduit being in communication with air; and
   (d) a sleeve surrounding said steam tube and being movably supported for displacement relative to said steam tube; said sleeve having a sleeve portion forming part of said second conduit; said sleeve having a first position in which said sleeve portion laterally closes said second conduit, whereby during operation the steam passing through said steam tube draws liquid through said first conduit and draws air through said second conduit to effect a discharge of a steam/liquid/air mixture through said outlet end of said steam tube; said sleeve having a second position in which said sleeve portion laterally opens said second conduit, whereby during operation the steam passing through said steam tube draws liquid through said first conduit, while said second conduit is blocked by liquid, to effect a discharge of solely a steam/liquid mixture through said outlet end of said steam tube.

2. The steam outlet tube assembly as defined in claim 1, wherein said steam tube has a Venturi constriction in said terminal length portion thereof; said constriction being spaced from said outlet end of said steam tube; said outlet end of said first conduit and said outlet end of said second conduit merging into said steam tube at said constriction.

3. The steam outlet tube assembly as defined in claim 1, wherein said outlet opening of said first conduit is common with said outlet opening of said second conduit.

4. The steam outlet tube assembly as defined in claim 1, further comprising a handle attached to said sleeve for displacing said sleeve.

5. The steam outlet tube assembly as defined in claim 1, wherein said sleeve is longitudinally displaceably supported.

6. A steam outlet tube assembly as defined in claim 1, wherein said steam tube has a longitudinal axis and said terminal length portion of said steam tube includes a plurality of outlet nozzles each having an outlet end; said outlet nozzles being circumferentially distributed and being oriented at an acute angle to said longitudinal axis; said steam tube being adapted to guide steam therein and eject the steam through said outlet end of said outlet nozzles; in operation said outlet end of said outlet nozzles being submerged in a liquid; said outlet end of said first conduit being positioned at the outlet opening of one of said outlet nozzles; and said outlet end of said second conduit being positioned at the outlet opening of one of said outlet nozzles.

7. The steam outlet tube assembly as defined in claim 6, wherein said sleeve is longitudinally displaceably supported.

8. The steam outlet tube assembly as defined in claim 6, further comprising a handle attached to said sleeve for displacing said sleeve.

9. The steam outlet tube assembly as defined in claim 6, further wherein there is provided a plurality of first conduits and a plurality of second conduits; each said first conduit and each said second conduit being associated with a separate said outlet nozzle.

10. The steam outlet tube assembly as defined in claim 9, further comprising means defining a plurality of low-pressure chambers communicating with the outlet of a separate said outlet nozzle; said outlet opening of said first conduits and said outlet opening of said second conduits merging into separate said low-pressure chambers.

11. A steam outlet tube assembly for preparing beverages, comprising (a) a steam tube having a terminal length portion including an outlet end; said steam tube being adapted to guide steam therein and eject the steam through said outlet end of said steam tube; in operation said outlet end of said steam tube being submerged in a liquid;

(b) a first conduit having an inlet end and an outlet end; said outlet end of said first conduit being located at said terminal length portion of said steam tube; in operation said inlet end of said first conduit being submerged in the liquid;

(c) a second conduit having an inlet end and an outlet end; said outlet end of said second conduit being located at said terminal length portion of said steam tube; in operation said inlet end of said second conduit being in communication with air; and (d) means for selectively placing said second conduit into an unblocked position and into a blocked position; in said unblocked position the steam passing through said steam tube draws liquid through said first conduit and draws air through said second conduit to effect a discharge of a steam/liquid/air mixture through said outlet end of said steam tube; in said blocked position the steam passing through said steam tube draws liquid through said first conduit, to effect a discharge of solely a steam/liquid mixture through said outlet end of said steam tube.

* * * * *